US011779028B2

(12) United States Patent
Rizvi et al.

(10) Patent No.: US 11,779,028 B2
(45) Date of Patent: *Oct. 10, 2023

(54) PROCESS FOR IMPROVING SHELF-LIFE OF FRESH CUT VEGETABLES AND FOOD PRODUCTS PRODUCED THEREBY

(71) Applicant: CORNELL UNIVERSITY, Ithaca, NY (US)

(72) Inventors: Syed S. H. Rizvi, Ithaca, NY (US); Vipul Prakash Saran, Rochester, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/461,823

(22) Filed: Aug. 30, 2021

(65) Prior Publication Data

US 2021/0386081 A1 Dec. 16, 2021

Related U.S. Application Data

(63) Continuation of application No. 16/271,761, filed on Feb. 8, 2019, now abandoned, which is a continuation
(Continued)

(51) Int. Cl.
 *A23B 7/02* (2006.01)
 *A23B 7/022* (2006.01)
(Continued)

(52) U.S. Cl.
 CPC .......... *A23B 7/0205* (2013.01); *A23B 7/0053* (2013.01); *A23B 7/022* (2013.01);
(Continued)

(58) Field of Classification Search
 CPC ..... A23B 7/022; A23B 7/0205; A23B 7/0053; A23B 7/06; A23B 7/157; A23B 7/10;
(Continued)

(56) References Cited

U.S. PATENT DOCUMENTS 4,336,273 A 6/1982 Lee
4,670,275 A 6/1987 Orr et al.
(Continued)

FOREIGN PATENT DOCUMENTS

CN 102113699 A 7/2011
EP 0811323 A1 12/1997
(Continued)

OTHER PUBLICATIONS

Brown, Z., Fryer, P., Norton, I., & Bridson, R. (2010). Drying of Agar Gels Using Supercritical Carbon Dioxide. The Journal of Supercritical Fluids, 54:89-95.
(Continued)

*Primary Examiner* — Subbalakshmi Prakash
(74) *Attorney, Agent, or Firm* — FisherBroyles, LLP; Andrew K. Gonsalves, Esq.

(57) ABSTRACT

The present disclosure relates to, inter alfa, processes for improving shelf-life and flavoring of fresh-cut/fresh vegetables, as well as food products produced by these processes. In accordance with the present disclosure, the processes generally include various new combinations of steps such as blanching, air drying, supercritical fluid processing with and without a processing aid, pressurization, de-pressurization, and packaging. The present disclosure further
(Continued)

relates to methods of preparing edible food products that incorporate the processed fresh-cut vegetables, as well as the food products produced by these methods.

19 Claims, 4 Drawing Sheets

Related U.S. Application Data of application No. 15/977,849, filed on May 11, 2018, now Pat. No. 10,492,507.

(60) Provisional application No. 62/504,889, filed on May 11, 2017.

(51) Int. Cl.
| | |
|---|---|
| *A23B 7/005* | (2006.01) |
| *A23B 7/154* | (2006.01) |
| *A23L 3/349* | (2006.01) |
| *A23L 3/3508* | (2006.01) |
| *A23L 3/3544* | (2006.01) |
| *A23L 3/3472* | (2006.01) |
| *A23B 7/10* | (2006.01) |
| *A23B 7/06* | (2006.01) |
| *A23B 7/157* | (2006.01) |

(52) U.S. Cl.
CPC ............... *A23B 7/06* (2013.01); *A23B 7/10* (2013.01); *A23B 7/154* (2013.01); *A23B 7/157* (2013.01); *A23L 3/349* (2013.01); *A23L 3/3472* (2013.01); *A23L 3/3508* (2013.01); *A23L 3/3544* (2013.01); *A23V 2002/00* (2013.01)

(58) Field of Classification Search
CPC ....... A23B 7/154; A23L 3/3544; A23L 3/349; A23L 3/3472; A23L 3/3508; A23V 2002/00
USPC ....................................................... 426/321
See application file for complete search history.

(56) References Cited

U.S. PATENT DOCUMENTS

| | | | |
|---|---|---|---|
| 4,988,523 | A | 1/1991 | Gardner et al. |
| 5,393,547 | A | 2/1995 | Balaban et al. |
| 5,486,369 | A | 1/1996 | Mason et al. |
| 5,597,599 | A | 1/1997 | Smith et al. |
| 5,922,374 | A | 7/1999 | Daury et al. |
| 6,962,714 | B2 | 11/2005 | Hei et al. |
| 7,108,832 | B2 | 9/2006 | Christensen et al. |
| 8,187,655 | B2 | 5/2012 | Agterof et al. |
| 9,271,511 | B2 | 3/2016 | Davis et al. |
| 2006/0292274 | A1 | 12/2006 | Garwood |
| 2008/0171116 | A1 | 7/2008 | Rasanayagam et al. |
| 2009/0068325 | A1 | 3/2009 | Depicciotto |
| 2010/0260891 | A1 | 10/2010 | Agterof et al. |
| 2011/0091618 | A1 | 4/2011 | Wang |
| 2012/0288614 | A1 | 11/2012 | Favreau et al. |
| 2013/0052318 | A1 | 2/2013 | Davis et al. |
| 2013/0287909 | A1 | 10/2013 | Lewis et al. |
| 2015/0010691 | A1 | 1/2015 | Siddoway et al. |
| 2015/0037389 | A1 | 2/2015 | Ragot et al. |
| 2016/0286829 | A1 | 10/2016 | Parker et al. |
| 2017/0035070 | A1 | 2/2017 | Hastings |
| 2018/0064157 | A1 | 3/2018 | Whitehead et al. |

FOREIGN PATENT DOCUMENTS

| | | |
|---|---|---|
| ES | 2302569 A1 | 7/2008 |
| IN | 00543MU2004 | 7/2006 |
| WO | 1990002799 A1 | 3/1990 |
| WO | 2006111425 A1 | 10/2006 |
| WO | 2007068345 A1 | 6/2007 |
| WO | 2007097626 A1 | 8/2007 |
| WO | 2014189376 A1 | 11/2014 |
| WO | 2015160269 A1 | 10/2015 |
| WO | 2016169815 A1 | 10/2016 |

OTHER PUBLICATIONS

Keyes, Frederick G. & Kirkwood, J. G. (1930). The Dielectric Constant of Carbon Dioxide as a Function of Temperature and Density. Physics Review, 36:754-761.

Gui, F., Wu, J., Chen, F., Liao, X., Hu, X., Zhang, Z., & Wang., Z. (2005). Inactivation of Poyphenol Oxidase in Cloudy Apple Juice Exposed to Supercritical Carbon Dioxide. Journal of Food Chemistry, 100:1678-1685.

King, M., Mubarak, A., & Kim, J. &. (2005). The Mutual Solubility of Water with Supercritical and Liquid Carbon Dioxide. Journal of Supercritical Fluids, 5:296-302.

Nijhuis, H., Torringa, H., Muresan, S., Yuksel, D., Leguijit, C., & Kloek, W. (1998). Approaches to Improving the Quality of Dried Fruit and Vegetables . Trends in Food Science and Technology, 9:13-20.

Oliveira, M., Abadias, M., Usal, J., Torres, R., Teixido, N., & Vinas, I. (2015). Application of Modified Atmospheric Packging as a Safety Approach to Fresh Cut Fruits and Vegetables. Trends in Food Science and Technology, 46:13-26.

Wimmer, Z., & Zarevucka, M. (2010). A Review on the Effects of Supercrititcal Carbon Dioxide on Enzyme Activity . International Journal of Molecular Sciences, 11:233-253.

Hofland, Gerard (May 30, 2014). Preserving Raw Materials Into Excellent and Sustainable End Products While Remaining Fresh. Final Report PRESERF, FeyeCon Carbon Dioxide Technologies BV, pp. 1-39.

Rawson, A., et al. (2012). Application of Supercritical Carbon Dioxide to Fruit and Vegetables: Extraction, Processing, and Preservation. Food Reviews International, 28:253-276.

Pinela et al. (2017). Nonthermal physical technologies to decontaminate and extend the shelf-life of fruits and vegetables: Trends aiming at quality and safety. Crit Rev Food Sci, 57(10):2095-2111.

Chemat et al. (2017). Review of Green Food Processing Techniques. Preservation, Transformation, and Extraction. Innov Food Sci, 41:357-377.

Ferrentino et al. (2013). Quality Attributes of Fresh-Cut Coconut After Supercritical Carbon Dioxide Pasteurization. J. Chemistry, 2013:1-9.

International Searching Authority, International Search Report and Written Opinion issued in International Application No. PCT/US2018/032416, dated Jul. 31, 2018.

Brown et al. (2008). Drying of Foods Using Supercritical Carbon Dioxide—Investigations with Carrot. Innovative Food Science and Emerging Technologies, 9:280-289.

Sumonsiri et al. (2014). Chapter 16: Fruits and Vegetables—Processing Technologies and Applications. Food Processing: Principles and Applications, Second Edition. John Wiley, pp. 363-381.

Brown, Z.K. (2010). The Drying of Foods Using Supercritical Carbon Dioxide, University of Birmingham Research Archive (E-Theses Repository), A Thesis Submitted to The University of Birmingham for the Degree of Doctor of Engineering, etheses.bham.ac.uk/72.

Swanson et al. (1989). Chapter 17: Chemistry and Safety of Acidified Vegetables. Quality Factors of Fruits and Vegetables, ACS Symposium Series, American Chemical Society: Washington, DC, pp. 216-223.

Colombian Patent and Trademark Office, Second Office Action issued in Colombian Counterpart Application No. NC2019/0013888 (dated Jan. 7, 2022) (Spanish only).

Colombian Patent and Trademark Office, Second Office Action issued in Colombian Counterpart Application No. NC2019/0013888 (dated Jan. 7, 2022) (English Translation).

Buelvas et al. (2015). Universidad De Cartagena. Technical and economic evaluation of the extraction of antioxidants from the shell

(56) References Cited

OTHER PUBLICATIONS of the seed of the cocoa (*Theobroma cacao* l.) using supercritical CO2 (Spanish with English Abstract).

Liu et al. (2007). Inactivation of peroxidase and polyphenol oxidase in red beet (*Beta vulgaris* L.) extract with high pressure carbon dioxide. Innovative Food Science and Emerging Technologies, 9(1):24-31.

Cheftel, J-C (1992). Effects of High Hydrostatic Pressure on Food Constituents: An Overview. High Pressure and Biotechnology, 224:195-209.

PROCESS FOR IMPROVING SHELF-LIFE OF FRESH CUT VEGETABLES AND FOOD PRODUCTS PRODUCED THEREBY

CROSS-REFERENCE TO RELATED APPLICATIONS

This patent application is a continuation of co-pending U.S. patent application Ser. No. 16/271,761, filed Feb. 8, 2019, which is a continuation of U.S. patent application Ser. No. 15/977,849, filed May 11, 2018 (U.S. Pat. No. 10,492,507, issued Dec. 3, 2019), which claims priority benefit of U.S. Provisional Patent Application Ser. No. 62/504,889, filed May 11, 2017. The disclosure of each patent application set forth in this Cross-Reference to Related Applications section is hereby incorporated by reference herein in their entirety.

FIELD OF THE INVENTION

The present disclosure relates to, inter alfa, processes for improving shelf-life of fresh-cut/fresh vegetables.

BACKGROUND OF THE INVENTION

Fresh vegetables have a short harvest period and have the tendency to spoil quickly if not stored under refrigerated conditions. Some practical methods for shelf-life extension of fresh vegetables have found significant commercial application. These methods include modified atmosphere packaging (MAP)/controlled atmosphere packaging (CAP), air drying, freeze drying, vacuum drying, individually quick freezing (IQF), and canning. With MAP/CAP, shelf-life is increased for a few days with refrigeration from packaging to consumption because microbial growth is dependent on the storage conditions (Oliveira, et al., 2015). The refrigeration increases the cost of shipping and storing MAP/CAP products.

Additionally, when fresh vegetables are peeled and cut, their shelf lives are reduced immensely due to the high probability of enhanced enzymatic activity and microbial growth. Methods used for shelf life extension of fresh cut vegetables also include air-drying, freeze-drying, vacuum drying, IQF, and canning. Dehydration using air is a commercially used practice but the collateral damage to the taste, nutritional quality, and structural deformation due to shrinkage of the product make the process unattractive. Although freeze-drying and vacuum drying provide better quality products, they suffer from the limitations in commercial application of being very expensive (Nijhuis, et al., 1998).

U.S. Pat. No. 4,988,523 describes a sulphite-free, antibrowning coating for fresh-peeled potatoes. The patent describes a dipping or spraying process employing a mixture of the commercial preservative SPORIX™ and citric acid. It can protect the color of fresh-peeled potatoes (whole or quartered) for up to 12 days without the use of sulphites and without imparting a sulphite-taste to the potato. However, the process requires that the potatoes be stored under refrigerated conditions (1-4° C.).

Some other techniques which are commercially practiced include canning and IQF. When compared to fresh produce, frozen vegetables that are later cooked have relatively poor texture. Furthermore, the cost of energy is high for IQF. Similarly, the thermal treatment during canning deteriorates the textural and nutritional qualities of the product.

U.S. Pat. No. 4,336,273 discloses a process for preserving vegetables by exposing them to a spray, vapor, or pool of organic compounds, such as aldehydes, amides, esters, hydrocarbons, halogenated hydrocarbons, ketones, etc., for 10-20 minutes between 0° to 75° C. Preservation with this technique requires washing or rinsing the organic compound from the vegetable prior to heat processing. The organic compound must be carefully and completely washed away. The flavors of the vegetables are adversely affected by overexposure to the organic compounds.

U.S. Pat. No. 5,486,369 describes a combination of blanching and drying to achieve a lower water activity to avoid growth of micro-organisms. The raw potato pieces are first blanched in a heated infusion solution containing one or more sugars and sodium chloride to infuse sugar and sodium chloride into the potato pieces. The potato pieces are dried by subjecting the pieces to heat for a sufficient time and temperature to reduce the water activity of the pieces to below 0.85. These potato pieces can be stored in ambient room temperatures and don't require any special packaging. The water activity below 0.85 along with high sodium and sugar concentration renders a final product which lacks desired characteristics both from a texture and taste point.

U.S. Published Patent Application No. U.S. 2015/0010691 describes a chemical preservation methodology. It is based on a preservative solution comprising of water, sodium chloride, citric acid, ascorbic acid, calcium chloride, sodium acid phyrophosphate, potassium sorbate and a protein based composition and applying the preservative solution to fresh cut potatoes. These products need to be kept under refrigeration for the period of their shelf life.

EP 0811323 describes another chemical preservation technology that uses the application of an aqueous solution in which a combination of two antioxidizing agents participate, specifically potassium metabisulfite and sodium disulfite, as well as a humidifying agent, specifically sorbitol, and a synergetic agent, specifically ascorbic D.L. acid, wherein prior to immersing the peeled potatoes in said aqueous solution there exists an intermediate humidification phase consisting of a water bath lasting for a period of approximately 30 minutes. The final product can be stored under refrigeration for 21 days.

Another method has been performed using $SCCO_2$ with ethanol as a processing aid (co-solvent) for the dehydration of Carrots (Fryer, Norton, bakalis, & bridson, 2007). The method describes a batch type system with continuous $CO_2$ flow mechanism operating at definite process parameters (200 Bar; 60° C.). During the process the product is placed without a pre-package into the high pressure chamber. According to the research, the texture of the product is better than the air dried products but not as good as its freeze-dried counterpart. This process is highly time consuming and it removes volatile compounds, resulting in flavor and color loss in the final product. It also states the process of $SCCO_2$ drying to be zero order and air-drying to be a first order process which is not true in this research.

Other related research publications show that inactivation of microbial and enzymatic activity can be accomplished by treatment with $SCCO_2$ (Wimmer & Zarevucka, 2010) which is also a batch type system. U.S. Pat. No. 7,108,832 describes the application of $SCCO_2$ for the sterilization of thermally or hydrolytically sensitive, medically-important materials including biodegradable and other medical polymers, tissue for implantation or transplantation, medical equipment, drugs and drug delivery systems. The product is processed in a system with a non-continuous $CO_2$ flow mechanism.

Similar is U.S. Published Patent Application No. U.S. 2012/0288614 A1, which uses supercritical carbon dioxide to achieve inactivation of the certain micro-organisms and enzymes in liquid, semi-solid and solid foods within a batch type apparatus with a non-continuous $CO_2$ operation. The operating temperature during the process is 40° C. wherein the product is packaged in a gas permeable bag (breathable) and is placed inside the pressure vessel. The vessel is pressurized to get the carbon dioxide to supercritical state and the product is exposed to the supercritical carbon dioxide for various time periods after which it is slowly depressurized to avoid the breakdown of the cellular structure of the product.

The present invention is directed to overcoming these and other deficiencies in the art.

SUMMARY OF THE INVENTION

The present disclosure relates to, inter alfa, processes for improving shelf-life and flavoring of fresh-cut/fresh vegetables, as well as food products produced by these processes. The present disclosure further relates to methods of preparing edible food products and the food products produced by these methods.

In one aspect, the present disclosure provides a process for improving shelf-life of fresh-cut vegetables that involves the steps generally described below (referred to herein generally as "Process A"). First, this process involves blanching unprocessed vegetable material that includes freshly cut vegetables. The blanching increases cell structure permeability of the freshly cut vegetables. This step yields a blanched vegetable preparation that is enhanced for accelerated moisture removal via a supercritical fluids procedure. Second, this process involves subjecting the blanched vegetable preparation to a first supercritical fluids procedure to remove a first percentage of moisture therefrom. The first supercritical fluids procedure is performed with a processing aid, thereby yielding an intermediate processed vegetable product infused with the processing aid. Third, this process involves performing a second supercritical fluids procedure to the intermediate processed vegetable product to remove a second percentage of moisture therefrom. The second supercritical fluids procedure is performed without the processing aid, thereby yielding a final processed vegetable product having improved shelf-life compared to that of the unprocessed vegetable material.

In another aspect, the present disclosure also provides a food product that includes the final processed vegetable product prepared by Process A and related embodiments thereof.

In a further aspect, the present disclosure provides a method of preparing an edible food product that includes the steps described below. First, this method involves performing Process A or related embodiments thereof to yield the final processed vegetable product having an improved shelf-life compared to the unprocessed vegetable material. Second, this method involves processing the final processed vegetable product using culinary techniques that can include, without limitation, boiling, frying, baking, toasting, microwaving, and the like. A food product produced according to this method is also provided by the present disclosure.

In one aspect, the present disclosure provides a process for improving shelf-life of fresh-cut vegetables that involves the steps generally described below (referred to herein generally as "Process B"). First, this process involves blanching unprocessed vegetable material that includes freshly cut vegetables, where the blanching increases cell structure permeability of the freshly cut vegetables. This step yields a blanched vegetable preparation that is enhanced for infusion of a processing aid within the cell structure of the freshly cut vegetables via a supercritical fluids procedure. Second, this process involves packaging the blanched vegetable preparation in a sealed gas permeable/breathable container with a defined volume of 0.001% or above of one or more processing aid. Third, this process involves subjecting the blanched vegetable preparation within the sealed gas permeable/breathable container to a supercritical fluids procedure at or above supercritical temperatures and pressures, thereby yielding a pressurized blanched vegetable preparation contained in the gas permeable/breathable container. Fourth, this process involves depressurizing the pressurized blanched vegetable preparation quickly to convert the supercritical fluids to a gas phase followed by a slow depressurization stage, thereby yielding a final vegetable product having an improved shelf-life compared to the unprocessed vegetable material.

In another aspect, the present disclosure also provides a food product that includes the final processed vegetable product prepared by Process B and related embodiments thereof.

In a further aspect, the present disclosure provides a method of preparing an edible food product that includes the steps described below. First, this method involves performing Process B or related embodiments thereof to yield the final processed vegetable product having an improved shelf-life compared to the unprocessed vegetable material. Second, this method involves processing the final processed vegetable product using culinary techniques that can include, without limitation, boiling, frying, baking, toasting, microwaving, and the like. A food product produced according to this method is also provided by the present disclosure.

In one aspect, the present disclosure provides a process for improving shelf-life of fresh-cut vegetables that involves the steps generally described below (referred to herein generally as "Process C"). First, this process involves performing Process A or related embodiments thereof to yield a first final processed vegetable product. Second, this process involves packaging the first final processed vegetable product in a sealed breathable film bag with a defined volume of one or more co-solvent. Third, this process involves subjecting the first final processed vegetable product within the sealed breathable film bag to a third supercritical fluids procedure along with temperature variations, thereby yielding a pressurized first final processed vegetable product contained in the sealed breathable film bag. Fourth, this process involves depressurizing the pressurized first final processed vegetable product quickly to convert the supercritical fluids to a gas phase followed by a slow depressurization stage, thereby yielding a completed vegetable product having an improved shelf-life compared to the unprocessed vegetable material.

In another aspect, the present disclosure also provides a food product that includes the completed vegetable product prepared by Process C and related embodiments thereof.

In a further aspect, the present disclosure provides a method of preparing an edible food product that includes the steps described below. First, this method involves performing Process C or related embodiments thereof to yield the completed vegetable product having an improved shelf-life compared to the unprocessed vegetable material. Second, this method involves processing the completed vegetable product using culinary techniques that can include, without limitation, boiling, frying, baking, toasting, microwaving, and the like. A food product produced according to this method is also provided by the present disclosure.

The processes of the present disclosure have the unique ability to reduce both the water activity and the pH within the fresh-cut vegetable product. Such a combination makes the resulting food product shelf-stable without requiring refrigerated or frozen storage conditions. The fresh-cut vegetable products can be made from vegetables such as sweet potato, yam, artichoke, radish, carrot, turnip, beet roots, other root vegetables, as well as other non-root/tuber vegetables.

Some advantages of the processes of the present disclosure include, for example, processes for making the vegetable product more convenient than currently available fresh produce or frozen/canned products. Another advantage is that the processes of the present disclosure allow for the production of healthier food products than the currently available fresh produce or frozen/canned produce by reducing the time and temperature required for cooking/frying/baking. Another advantage of the processes of the present disclosure is the development of alternative shelf-life extension methods for fresh-cut vegetables to the existing methods of dehydrating, chemical treatments, freezing and canning.

In one embodiment of the processes for improving shelf-life of fresh-cut vegetables, the present disclosure provides a process that involves a combination of blanching, air-drying (optional), and supercritical $CO_2$ ($SCCO_2$) treatment, with and then without processing aid (co-solvent), of fresh-cut vegetables for extension of their shelf life at room temperature and even a longer shelf life under refrigerated conditions. The fresh-cut and/or peeled vegetables are blanched, partly air-dried (optional) and then treated with the $SCCO_2$ containing processing aid (co-solvent). Subsequently, $SCCO_2$ treatment may continue without any processing aid (co-solvent) to remove any residual processing aid (co-solvent) from the product.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, if provided, like reference numerals contained in the drawings are meant to identify similar or identical elements.

DESCRIPTION OF THE INVENTION

The present disclosure provides various processes for improving shelf-life of fresh-cut vegetables. As used herein, "improving shelf-life" refers to an improvement of the shelf-life at room temperature of the vegetable, and an even longer improvement of its shelf-life when stored under refrigerated conditions. One mechanism by which the shelf-life of the vegetables is improved is due to the removal of moisture from the vegetables, which in turn decreases the water activity ($A_w$) thereof. The improvement of shelf-life can also include removal of moisture and the reduction of pH and water activity, while at the same time minimizing shrinkage.

Suitable vegetables for use in the processes of the present invention can include all vegetable. For example, suitable vegetables for use in the processes of the present invention can include, without limitation, potato, sweet potato, yam, artichoke, radish, carrot, turnip, beet roots, other root vegetables, and other non-root/tuber vegetables.

As used herein, the term "fresh-cut vegetables" refers to vegetables that are cut into portions or pieces prior to undergoing any processing (e.g., heating, freezing, canning, and chemical treatments) that would alter their cell structure in a significant manner as compared to their cell structure at the time of harvest. The vegetables may be cut into portions or pieces within about 60 minutes or less prior to being subjected to blanching, as described herein. The vegetables can be cut in any manner suitable for the type of vegetable. For example, potatoes can be cut into pieces suitable for standard French fries, tater tots, scalloped potatoes, etc. For vegetables that naturally have outer skins (e.g., potatoes), they can be used in the processes of the present invention with or without their peelings. For example, when using a potato in the process, the fresh-cut potato can be used with or without its peel.

As used herein, the term "blanching" generally refers to a process of cooking freshly cut vegetables in water at an elevated temperature for a desired period of time in order to increase the permeability within the cellular and to inactivate the surface enzymatic activity. In one embodiment, the blanching is conducted at a temperature of between about 65-90° C. for at least 5 minutes, at least 10 minutes, at least 15 minutes, at least 20 minutes, at least 25 minutes, at least 30 minutes, at least 35 minutes, and so forth, up to a maximum 120 minutes.

As used herein, the term "supercritical fluids procedures" generally refers to a process of subjecting a vegetable material to supercritical fluids in order to infuse/impregnate the said product with processing aids to either reduce the equilibrium pH of the product, enhance the organoleptic properties, or/and to remove moisture from the product without resulting in shrinkage thus reducing the water activity. Suitable supercritical fluids for use in the process of the present disclosure can include, without limitation, carbon dioxide, nitrous oxide, ethanol, propane, ethylene, acetone, and the like.

As used herein, a "supercritical pressure" for a substance (e.g., compound, composition, etc.) includes pressures having a value above that substance's critical pressure.

As used herein, a "supercritical temperature" for a substance (e.g., compound, composition, etc.) includes temperatures above that substance's critical temperature.

As used herein, when a substance (e.g., compound, composition, etc.) is subjected to a pressure and a temperature higher than its critical pressure and temperature point, the fluid is said to be "supercritical."

As used herein, the term "processing aid" refers to co-solvent that is used in a supercritical fluids procedure in order to infuse/impregnate the vegetable product with either one or a combination of various processing aids to either enhance the organoleptic properties or/and to remove moisture from the product without resulting in shrinkage thus reducing the water activity. Suitable processing aids can include, without limitation, co-solvents such as ethanol, distilled water vinegar, vinegar, lemon juice, lemon juice concentrate, apple juice, apple juice concentrate, cumin seed, ginger, garlic, lactic acid, gluconic acid, malic acid, peroxyacetic acid, tartaric acid, acetic acid and its derivatives, sodium bisulfate, gluconodeltalactone (GDL), citric acid, buffers of such acids, oleoresins, and the like.

As used herein, the term "reducing co-solvent" refers to any co-solvent that can be added to the vegetable material during the processes of the present invention in order to decrease the pH equilibrium thereof. Suitable reducing co-solvents can include, without limitation, ethanol, distilled water vinegar, vinegar, lemon juice, lemon juice concentrate, apple juice, apple juice concentrate, cumin seed, ginger, garlic, lactic acid, gluconic acid, malic acid, peroxyacetic acid, tartaric acid, acetic acid and its derivatives, sodium bisulfate, gluconodeltalactone (GDL), citric acid, buffers of such acids, oleoresins, and the like.

The processes of the present disclosure combine various processing steps in a unique way in order to achieve more efficient end results. The process of blanching allows the cell membrane to become more permeable. This augments the removal of water during air drying as the water finds it easier to migrate to the surface. Once the surface moisture has been removed with the help of air drying, the remaining internal moisture needs to be taken out with minimum deterioration within the cellular structure of the vegetable product. Due to the porous cell structure and surface moisture already removed, the penetration of the modified supercritical fluid (i.e., along with the co-solvent) within the cell structure becomes easier, thus more water present within the internal cellular structure can be displaced from the product with minimum shrinkage of the product. Within the process, the supercritical fluid acts as a transportation medium that can solubilize the processing aid and transport it to the internal cellular structure which otherwise is efficiently not possible. This solubilized processing aid can now interact with the free water molecules within the cellular structure to form bonds and thus, together can be carried out by the transportation medium, the supercritical fluid, without destroying the cell walls that could otherwise result into shrinkage. This processing style allows for the uniform removal of the moisture from the entire cross section of the product thus resulting in the lowered $A_w$, water activity of 0.93 or below, which inhibits the growth of various micro-organisms of concern to food safety, without adversely affecting the final texture and taste of end product.

Similarly, during the static processing technique, due to more permeability within the cell structure of the product, the supercritical fluid as a transportation medium can solubilize the processing aid and transport it to the internal cellular structure to deposit the processing aid there, which is otherwise not efficiently possible. The processing technique accounts for a swift depressurization step to change the state of the fluid (transportation medium) from supercritical to gas phase that augments the rate of deposition. This results in more infusion or impregnation of the processing aid (co-solvent), thus allowing the reduction of the equilibrium pH very swiftly. Also, more infusion of various essential oils within the cell structure of the product allows for better anti-microbial properties. The uniform deposition of the processing aid renders a lowered equilibrium pH of 4.6 or below, which inhibits the growth of various micro-organisms of concern to food safety, without adversely affecting the final texture and taste of the end product. This methodology allows for the usage of much diluted processing aid solutions to get to the equilibrium pH of 4.6 and below, which is otherwise not possible with any other technique. The end product developed from the current technique has a crispier texture as the processing aid being acidic, inhibits the breakdown of the pectin within the cell wall. And eventually the end product holds its texture better and also has a lower cook time due to lower moisture and softer tissue of the end vegetable product. This also results in more than 30% less oil uptake in the product which are fried in oil.

I. Process A: Improving Shelf-Life of Fresh-Cut Vegetables

In one aspect, the present disclosure provides a process for improving shelf-life of fresh-cut vegetables that involves the following steps: (i) blanching unprocessed vegetable material that includes freshly cut vegetables, where the blanching increases cell structure permeability of the freshly cut vegetables, thereby yielding a blanched vegetable preparation that is enhanced for accelerated moisture removal via a supercritical fluids procedure; (ii) subjecting the blanched vegetable preparation to a first supercritical fluids procedure to remove a first percentage of moisture therefrom, where the first supercritical fluids procedure is performed with a processing aid, thereby yielding an intermediate processed vegetable product infused with the processing aid; and (iii) performing a second supercritical fluids procedure to the intermediate processed vegetable product to remove a second percentage of moisture therefrom, where the second supercritical fluids procedure is performed without the processing aid, thereby yielding a final processed vegetable product having improved shelf-life compared to that of the unprocessed vegetable material.

In accordance with this process, the improved shelf-life of the final processed vegetable product corresponds to a water activity ($A_w$) of below 0.93. In one embodiment, the water activity ($A_w$) is between about 0.6 and about 0.93.

In accordance with this process, the percentage of moisture removed from the unprocessed vegetable material upon completion of the process is between about 1-80 percent.

In accordance with this process, the first percentage of moisture removed is at least 1 percent.

In accordance with this process, the second percentage of moisture removed is at least 0.5 percent.

In one embodiment, the blanching is conducted at a temperature of between about 65-90° C. for at least 5 minutes, at least 10 minutes, at least 15 minutes, at least 20 minutes, at least 25 minutes, at least 30 minutes, at least 35 minutes, and so forth, up to a maximum of 120 minutes.

In one embodiment with this process, when the freshly cut vegetables have an outer skin that can be peeled, the blanching step is performed with the freshly cut vegetables with and/or without the peel.

In one embodiment of this process, the first supercritical fluids procedure is carried out at or above supercritical pressures and temperatures and at a fluids flow rate at or above 1 liter/minute to provide a residence time of 10 seconds or above with 2 percent or more of the processing aid of the total mass of freshly cut vegetables for 1 minute or more.

In one embodiment of this process, the second supercritical fluids procedure is carried out at or above supercritical pressures and temperatures and at a fluids flow rate at or above 1 liter/minute to provide a residence time of 10 seconds or above in absence of the processing aid for 1 minute or more.

In one embodiment of this process, the first supercritical fluids procedure and the second supercritical fluids procedure are carried out under continuous flow. For example, when product is placed in the basket and when this basket is placed in the chamber, then the chamber is closed and the system is equilibrated with the supercritical fluid from the source to 750 psi. Once this is done, then the pump is turned on to further pressurize the chamber at or above the critical point so that the fluid is in the supercritical state. During this step, the supercritical fluid enters the chamber along with the processing aid, which is introduced via a separate pump into the chamber. Once the fluid and the processing aid come together, then the supercritical fluid solubilizes the processing aid within itself and interacts with the vegetable product to infuse the processing aid (co-solvent) into the cellular structure. The processing aid is introduced at a defined flow rate to get 2% or more of processing aid of total volume of vegetable product into the chamber in the entire duration of the processing run time. Once the required pressure and temperature are attained inside the chamber, then the supercritical fluid is allowed to flow at a certain rate of 1 liter/minute or above through the chamber along with the processing aid. This processing style has been termed as a continuous flow, wherein the supercritical fluid flows continuously through the chamber at a certain flow rate which results in the continuous removal of water/moisture from the product. Once the first half of the moisture is removed from the product then the flow of the processing aid is stopped. And the second supercritical fluid procedure is applied for a controlled period of time without the processing aid to help remove the additional half of the moisture along with the extra amount of the processing aid (co-solvent) which could potentially adversely affect the taste profile of the end product.

In one embodiment, this process further includes a step of air-drying the blanched vegetable preparation prior to subjecting it to the first supercritical fluids procedure, thereby facilitating moisture removal from the blanched vegetable preparation during the first supercritical fluids procedure. In a particular embodiment, the air-drying step includes drying at about 50-250° C. for 1 minute or above (i.e., up to about 45 minutes).

In one embodiment, this process further includes the step of reducing equilibrium pH of the final processed vegetable product by contacting it with one or a combination of pH reducing co-solvents. In a particular embodiment, the equilibrium pH of the final processed vegetable product is reduced to below 4.6, and as low as about 3.0.

In another aspect, the present disclosure also provides a food product that includes the final processed vegetable product prepared by this process.

In a further aspect, the present disclosure provides a method of preparing an edible food product that includes the steps of: (i) performing this process to yield the final processed vegetable product having an improved shelf-life compared to the unprocessed vegetable material; and (ii) processing the final processed vegetable product using culinary techniques that can include, without limitation, boiling, frying, baking, toasting, microwaving, and the like. A food product produced according to this method is also provided by the present disclosure.

II. Process B: Improving Shelf-Life of Fresh-Cut Vegetables

In one aspect, the present disclosure provides a process for improving shelf-life of fresh-cut vegetables that includes the steps of: (i) blanching unprocessed vegetable material that includes freshly cut vegetables, where the blanching increases cell structure permeability of the freshly cut vegetables, thereby yielding a blanched vegetable preparation that is enhanced for infusion of a processing aid within the cell structure of the freshly cut vegetables via a supercritical fluids procedure; (ii) packaging the blanched vegetable preparation in a sealed gas permeable/breathable container with a defined volume of 0.001% or above of one or more processing aid; (iii) subjecting the blanched vegetable preparation within the sealed gas permeable/breathable container to a supercritical fluids procedure at or above supercritical temperatures and pressures, thereby yielding a pressurized blanched vegetable preparation contained in the gas permeable/breathable container; and (iv) depressurizing the pressurized blanched vegetable preparation quickly to convert the supercritical fluids to a gas phase followed by a slow depressurization stage, thereby yielding a final vegetable product having an improved shelf-life compared to the unprocessed vegetable material.

In one embodiment, the blanching is conducted at a temperature of between about 65-90° C. for at least 5 minutes, at least 10 minutes, at least 15 minutes, at least 20 minutes, at least 25 minutes, at least 30 minutes, at least 35 minutes, and so forth, up to a maximum of 120 minutes.

In accordance with this process, the step of packaging the blanched vegetable preparation in a sealed gas permeable/breathable container is performed with a defined volume of 0.001% or above of one or more processing aid. As used herein, a "gas permeable/breathable container" refers to any container, bag, or pouch that has a breathable film or a porous membrane or a perforated film membrane. Suitable examples of gas permeable/breathable containers for use in this process can include, without limitation, TYVEK® pouches, header bags with TYVEK® strips attached, perforated plastic bags/pouches, perforated paper based bags/pouches. The method of sealing the gas permeable/breathable container can involve the standard methods and techniques to seal such container (e.g., heat sealing, hand crimping). The defined volume of the one or more processing aid can be between 0.001% to about 30%.

In accordance with this process, the step of subjecting the blanched vegetable preparation within the sealed gas permeable/breathable container to a supercritical fluids procedure at or above supercritical temperatures and pressures to remove a percentage of moisture therefrom can be performed as noted below. For example, in one embodiment, packaging the blanched vegetable is done in the breathable bag, and then adding the processing aid (co-solvent) to the bag followed by heat sealing the bag. The bag may or may not be flipped upside down to allow for the processing aid to mix with the vegetable product. Thereafter, the sealed bags are placed in the perforated basket, which is further placed into the chamber. After the basket is in the chamber, then the chamber is closed and the system is equilibrated with the supercritical fluid from the source to 750 psi. Once this is done, then the pump is turned on to further pressurize the chamber at or above the critical point so that the fluid is in the supercritical state. During this step, as the supercritical fluid enters the chamber, it simultaneously enters inside the bags via the breathable portion of the bag and interacts with the processing aid to solubilize it within itself and interact with the vegetable product to infuse the processing aid (co-solvent) into the cellular structure. The processing aid can also be introduced via a separate pump in to the chamber at a defined flow rate to get 2% or more of processing aid of total volume of vegetable product into the chamber in the entire duration of the processing run time. Once the required pressure and temperature are attained inside the chamber and the bag, then the product is left to sit within the chamber for sometime to let the modified supercritical fluid (i.e., with the processing aid) infuse into the vegetable product and equilibrate itself uniformly within the vegetable product. After which, the system is quickly depressurized to change the phase of the fluid from supercritical to gas phase, which is then followed by slow depressurization. This step of swift depressurization allows the state of the fluid to change which results in the separation of the processing aid from the fluid as the processing aid cannot remain solubilized in the gas phase of the fluid; therefore, this step results in the deposition of the processing aid within the cellular structure of the vegetable product.

As used herein, "pressurized" means a pressure above the critical pressure of the fluid.

In accordance with this process, the step of depressurizing the pressurized blanched vegetable preparation is done quickly to convert the supercritical fluids to a gas phase followed by a slow depressurization stage, thereby yielding a final vegetable product having an improved shelf-life compared to the unprocessed vegetable material. As used herein, "quickly" refers to a faster rate of depressurization which results in the sudden drop of the pressure of fluid below its critical point thus allowing the fluid to covert from supercritical to gas phase. In accordance with this process, the "slow depressurization stage" is defined as a slower rate of depressurization which does not impair the integrity of the bag or the vegetable inside.

In one embodiment, this process further includes a step of air-drying the blanched vegetable preparation prior to subjecting it to the supercritical fluids procedure, thereby facilitating moisture removal from the blanched vegetable preparation during the supercritical fluids procedure. In a particular embodiment, the air-drying step includes drying at about 50-250° C. for 1 minute or above (i.e., up to about 45 minutes).

In one embodiment, this process further includes the step of reducing equilibrium pH of the final processed vegetable product by contacting it with a reducing co-solvent. In a particular embodiment, the equilibrium pH of the final processed vegetable product is reduced to below 4.6, and as low as about 3.0.

In one embodiment of this process, the supercritical fluids procedure is carried out at no-flow conditions (0 liters/minute).

In one embodiment of this process, when the freshly cut vegetables have an outer skin that can be peeled, the blanching step is performed with the freshly cut vegetables with and/or without the peel.

In another aspect, the present disclosure also provides a food product that includes the final processed vegetable product prepared by this process.

In a further aspect, the present disclosure provides a method of preparing an edible food product that includes the steps of: (i) performing this process to yield the final processed vegetable product having an improved shelf-life compared to the unprocessed vegetable material; and (ii) processing the final processed vegetable product using culinary techniques that can include, without limitation, boiling, frying, baking, toasting, microwaving, and the like. A food product produced according to this method is also provided by the present disclosure.

III. Process C: Improving Shelf-Life of Fresh-Cut Vegetables

In one aspect, the present disclosure provides a process for improving shelf-life of fresh-cut vegetables that includes the steps of: (i) performing Process A as described herein to yield a first final processed vegetable product; (ii) packaging the first final processed vegetable product in a sealed breathable film bag with a defined volume of one or more co-solvent; (iii) subjecting the first final processed vegetable product within the sealed breathable film bag to a third supercritical fluids procedure along with temperature variations, thereby yielding a pressurized first final processed vegetable product contained in the sealed breathable film bag; and (iv) depressurizing the pressurized first final processed vegetable product quickly to convert the supercritical fluids to a gas phase followed by a slow depressurization stage, thereby yielding a completed vegetable product having an improved shelf-life compared to the unprocessed vegetable material.

As used herein, a "gas permeable/breathable container" refers to any container, bag, or pouch that has a breathable film or a porous membrane or a perforated film membrane. Suitable examples of gas permeable/breathable containers for use in this process can include, without limitation, TYVEK® pouches, header bags with TYVEK® strips attached, perforated plastic bags/pouches, perforated paper based bags/pouches, and the like. The method of sealing the gas permeable/breathable container can involve the standard methods and techniques to seal such container (e.g., heat sealing). The defined volume of the one or more processing aid can be between about 0.001% to about 30%

In accordance with this process, the third supercritical fluids procedure (along with temperature variations) can include the steps of processing the vegetable product with the steps described for Process A, herein, followed by packaging the product into breathable bags/pouches and also introducing the defined quantity of the processing aid (co-solvents). The bags would then be heat sealed and placed in the baskets which are then placed in the chamber and the system is pressurized. Once the system reaches the required pressure and temperature within the supercritical state, then the product is let to sit within the chamber for a time sufficient to let the processing aid infuse into the vegetable product with the help of the transportation medium, which is the supercritical fluid, and equilibrate itself uniformly within the vegetable product. Thereafter, the system is quickly depressurized to change the phase of the fluid from supercritical to gas phase, which is then followed by slow depressurization. This step of swift depressurization allows the state of the fluid to change, which results in the separation of the processing aid from the fluid as the processing aid cannot remain solubilized in the gas phase of the fluid; therefore, this step results in the deposition of the processing aid within the cellular structure of the vegetable product. This third supercritical fluids procedure is performed so as to yield a pressurized first final processed vegetable product contained in the sealed breathable film bag. As used herein, "pressurized" means a pressure of at or above the critical point.

In accordance with this process, the step of depressurizing the pressurized first final processed vegetable product is done quickly to convert the supercritical fluids to a gas phase followed by a slow depressurization stage, thereby yielding a completed vegetable product having an improved shelf-life compared to the unprocessed vegetable material. As used herein, "quickly" refers to a faster rate of depressurization which results in the sudden drop of the pressure of fluid below its critical point thus allowing the fluid to covert from supercritical to gas phase. In accordance with this process, the "slow depressurization stage" is defined as a slower rate of depressurization which does not impair the integrity of the bag or the vegetable inside. In another aspect, the present disclosure also provides a food product that includes the completed vegetable product prepared by this process.

In a further aspect, the present disclosure provides a method of preparing an edible food product that includes the steps of: (i) performing this process to yield the final processed vegetable product having an improved shelf-life compared to the unprocessed vegetable material; and (ii) processing the completed vegetable product using culinary techniques that can include, without limitation, boiling, frying, baking, toasting, microwaving, and the like. A food product produced according to this method is also provided by the present disclosure.

All numeric ranges are inclusive of narrower ranges; delineated upper and lower range limits are interchangeable to create further ranges not explicitly delineated.

IV. Additional Embodiments of a Process for Improving Shelf-Life of Fresh-Cut Vegetables Additional embodiments of a process for improving shelf-life of fresh-cut/fresh vegetables are disclosed. In one aspect, a new process has been developed which is a combination of blanching, air-drying (optional), and supercritical $CO_2$ ($SCCO_2$) treatment, with and then without a processing aid (co-solvent) of fresh-cut vegetables for extension of their shelf life at room temperature and even a longer shelf life under refrigerated conditions. The processing aids (co-solvents) are polar or non-polar solvents such as ethanol, vinegar, apple juice concentrate, lactic acid, gluconodeltalactone, oleoresins and other materials which are mixed with supercritical $CO_2$.

One example of the process would be its application to remove moisture from the product to achieve a lower water activity ($A_w$) by including the step of blanching of the fresh-cut and/or peeled vegetables, followed by partial air-drying (optional) and then treatment with the $SCCO_2$ containing ethanol. Subsequently, $SCCO_2$ treatment continues without any ethanol addition to remove any residual ethanol from the product.

The other example of the process would include the step of blanching, followed by partial air drying (optional), then the treatment with $SCCO_2$ with a polar acidic processing aid (co-solvent) formulations such as 5% distilled water vinegar or apple juice concentrate with lemon juice concentrate and garlic to infuse the acid in the cellular structure to attain lower equilibrium pH by manipulating the temperature of the carbon dioxide during process to change the solubility of the $CO_2$ followed by quick decrease in the pressure to change the state of the supercritical $CO_2$ to gas phase.

Another example of the process would include the step of blanching, followed by partial drying (optional), then the treatment with $SCCO_2$ with an essential oil like citral and eugenol to impregnate the processing aid (co-solvent) into the cellular structure of the product by manipulating the temperature of the carbon dioxide during process to change the solubility of the $CO_2$ followed by quick decrease in the pressure to change the state of the supercritical $CO_2$ to gas phase.

In one aspect, the present invention relates to a process for improving shelf-life of fresh-cut vegetables, said process comprising the steps of: (i) blanching freshly cut vegetables (with or without peel) to yield a blanched vegetable preparation; (ii) subjecting the blanched vegetable preparation to a first supercritical $CO_2$ procedure to remove a percentage of moisture (5% and or above) therefrom, wherein the first supercritical $CO_2$ procedure is performed with ethanol; and (iii) performing a second supercritical $CO_2$ procedure to the blanched vegetable preparation to remove a further percentage of moisture (5% and or above) therefrom, wherein the second supercritical $CO_2$ procedure is performed without ethanol.

In one embodiment of the process, the blanching is conducted at about 45-90° C. for about 5-30 minutes.

In one embodiment of the process, the first supercritical $CO_2$ procedure is carried out at a pressure of about 150-400 bar, a temperature of about 35-130° C., and a $CO_2$ flow rate of about 1-100 L/minute in a dynamic $CO_2$ operation or a static $CO_2$ operation to provide a residence time of 10 seconds to 20 minutes with 2-8 mol % of processing aid (co-solvent) for about 5-120 minutes.

In one embodiment of the process, the second supercritical $CO_2$ procedure is carried out at a pressure of about 150-350 bar, a temperature of about 35-130° C., and a $CO_2$ flow rate of about 1-100 L/minute in a dynamic $CO_2$ operation or a static $CO_2$ operation to provide a residence time of 10 seconds to 20 minute in the absence of ethanol for about 5-120 minutes.

In one embodiment of the process, the first supercritical $CO_2$ procedure and second supercritical $CO_2$ procedure are carried out under continuous or non-continuous flow.

In one embodiment, the process further comprises air drying the blanched vegetable preparation prior to subjecting it to the first supercritical $CO_2$ procedure. In a particular embodiment of the process, the air drying step comprises drying at about 50-100° C. for about 10-25 minutes.

In one embodiment, the process comprises infusion/impregnation of soluble compounds into the blanched vegetable preparation.

In one embodiment of the process, the supercritical $CO_2$ is carried out at a pressure of about 150-350 bar, a temperature of about 35-130° C., and the $CO_2$ flow is static to provide a residence time of 1-20 minutes.

In one embodiment of the process, the pre-cut vegetables are packaged, wherein the packaging consists of gas permeable/breathable material.

In one embodiment of the process, the soluble solvents (solid or liquid) are placed in the same packaging as the vegetable or are placed separately into the chamber during the process.

In one embodiment of the process, the temperature of the carbon dioxide is manipulated to change the solubility of the carbon dioxide during the process and similarly the pressure is changed during the process to change the state of carbon dioxide between supercritical and gas phase.

The process of the present invention is effective to reduce the equilibrium pH of the low acid vegetable products below 4.6 within the defined run time (30 seconds and above).

The process of the present invention is effective to reduce the enzymatic activity in pre-cut vegetables upwards of 95%.

The process of the present invention can be used to process any vegetable, including, without limitation, vegetables such as sweet potato, yam, artichoke, radish, carrot, turnip, beet roots, other root vegetables, and other non-root/tuber vegetables.

The process of the present invention is effective to remove about 30-50% of moisture from fresh-cut vegetables.

In another aspect, the present invention relates to a food product comprising vegetables prepared by a process according to the present disclosure.

In another aspect, the present invention relates to a method of preparing an edible food product, said method comprising: (i) performing the process according to the present disclosure so as to yield a vegetable product having an improved shelf-life with a lower $A_w$ (water activity) below 0.93; and (ii) processing the vegetable product using culinary techniques selected from the group consisting of boiling, frying, baking, toasting, microwaving, and the like. In another aspect, the present invention relates a food product produced according to this method.

EXAMPLES

The following examples are intended to illustrate particular embodiments of the present invention, but are by no means intended to limit the scope of the present invention.

Example 1

Shelf-Life Extension using Supercritical $CO_2$

Figure 1A:
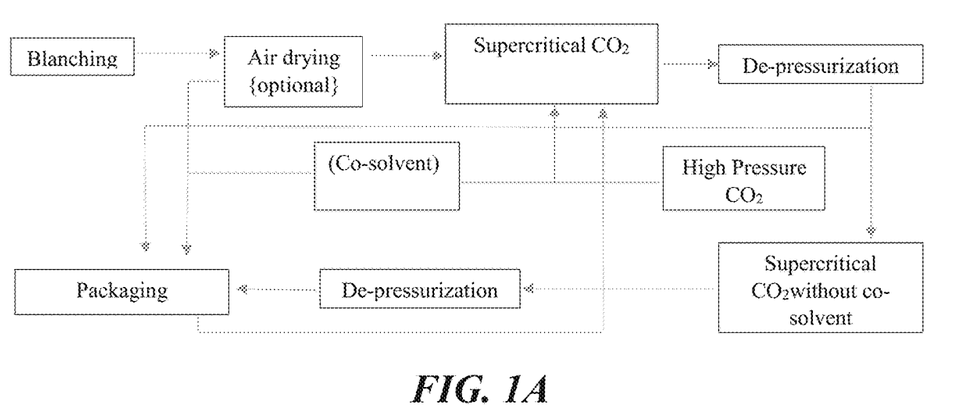
FIG. 1A is a schematic of a process flow diagram of one embodiment of a process for improving shelf-life of fresh-cut vegetables according to the present disclosure.

One embodiment of a process of the present disclosure is illustrated in the process flow diagram of FIG. 1A. As shown in FIG. 1A, the process can include the use of supercritical $CO_2$ and the following steps: blanching, air drying (optional), supercritical $CO_2$ (with a co-solvent), de-pressurization, supercritical $CO_2$ (without a co-solvent), de-pressurization, and packaging. Alternatively, as shown in FIG. 1A, this embodiment can include packaging of the vegetables after the air drying step and before the supercritical $CO_2$ (with co-solvent) step.

Figure 1B:
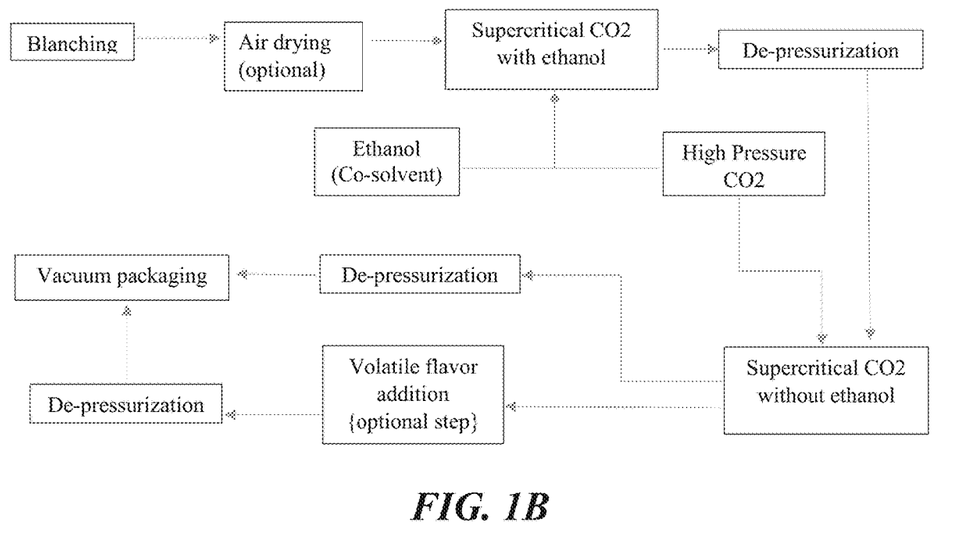
FIG. 1B is a schematic of a process flow diagram of another embodiment of a process for improving shelf-life of fresh-cut vegetables according to the present disclosure.

Another embodiment of a process of the present disclosure is illustrated in the process flow diagram of FIG. 1B. As shown in FIG. 1B, the process can include the use of supercritical $CO_2$ and the following steps: blanching, air drying (optional), supercritical $CO_2$ (with ethanol as the co-solvent), de-pressurization, supercritical $CO_2$ (without the ethanol co-solvent), de-pressurization, and vacuum packaging. Alternatively, as shown in FIG. 1B, this embodiment can include addition of volatile flavor after the supercritical $CO_2$ (without ethanol) step, de-pressurization, and then the vacuum packaging.

In one embodiment of the process of the present disclosure, the process can involve the following combination of steps: (i) blanching freshly cut vegetables (with or without peel) at 45-90° C. for 5-30 minutes; (ii) optionally, partially air drying the blanched peeled and cut vegetables at 50-100° C. for 10-25 minutes; (iii) next, processing with high pressure $SCCO_2$ containing processing aid (co-solvent) (pressure: 150-350 Bar; temperature: 35-130° C.; $CO_2$ flow rate: 1-100 L/minute in a dynamic operation to provide a residence time of 10 seconds to 20 minute ; processing aid (co-solvent) flow rate: 2-8 mol % of the $CO_2$ flow rate.) for a period of time; and (iv) optionally, processing with the $SCCO_2$ without processing aid (co-solvent) (pressure: 150-350 Bar; temperature: 35-130° C.; $CO_2$ flow rate: 1-100 L/minute in a dynamic operation to provide a residence time of 10 seconds to 20 minute) for a period of time.

The high pressure during the process increases the solubility of the $SCCO_2$ and the higher temperature increases the diffusivity of the $CO_2$ which helps enhance the penetration of the $CO_2$ (King, Mubarak, & Kim, 2005) (Frederick G & Kirkwood, 1930) into the product leading to a faster reduction of the water activity of the product along with a reduction of the pH of the product. This process with a polar processing aid (co-solvent) such as ethanol or 5% distilled water vinegar and other oleoresins also causes an increase in the polarity of the $SCCO_2$, thus allowing maximum extraction of the cytoplasmic material from any microorganisms in the product and thereby achieving longer shelf life. The increase in the polarity also increases the reduction rate of the water activity by increasing the solubility of the water in the supercritical $CO_2$ and causing faster removal of water.

Combining, the blanching and the $SCCO_2$ with processing aid (co-solvent) treatments synergistically enhances the ability of these individual treatments to reduce the pH and Aw thus resulting in shelf-stable fresh-cut vegetables. Also, the $SCCO_2$ treatments combined with the optional air-drying reduces the water activity with minimum shrinkage.

The uniqueness of the process is achieved through the sequence in which the process is performed. The process of blanching allows the cell membrane to become more porous. This augments the removal of water during air drying as the water finds it easier to escape to the surface. Due to this, the penetration of the supercritical carbon dioxide along with the processing aid (co-solvent) within the cell structure becomes easier thus more water present within the cellular can be removed from the product with minimum shrinkage of the product. Similarly, due to more porosity within the cell structure of product, more infusion or impregnation of the processing aid (co-solvent) such as oleoresins or 5% distilled water vinegar or Apple juice concentrate can happen thus allowing in the reduction of the equilibrium pH swiftly. Also more infusion of various essential oils within the cell structure of the product allows better anti-microbial properties.

Figure 2:
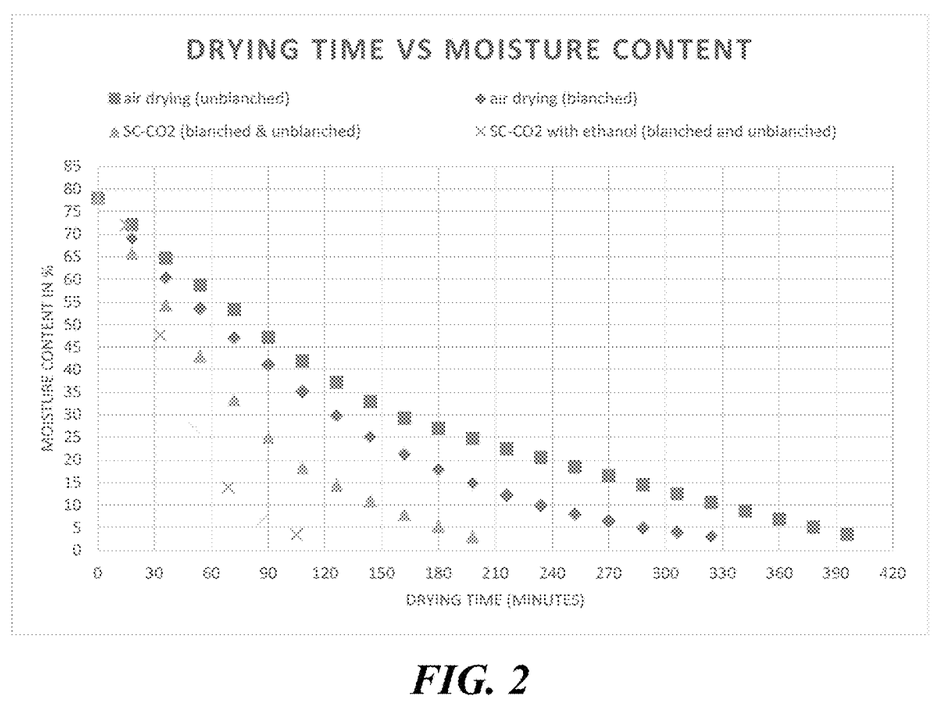
FIG. 2 is a graph illustrating moisture content versus drying time for different methods for preparing potato.
Figure 3A:
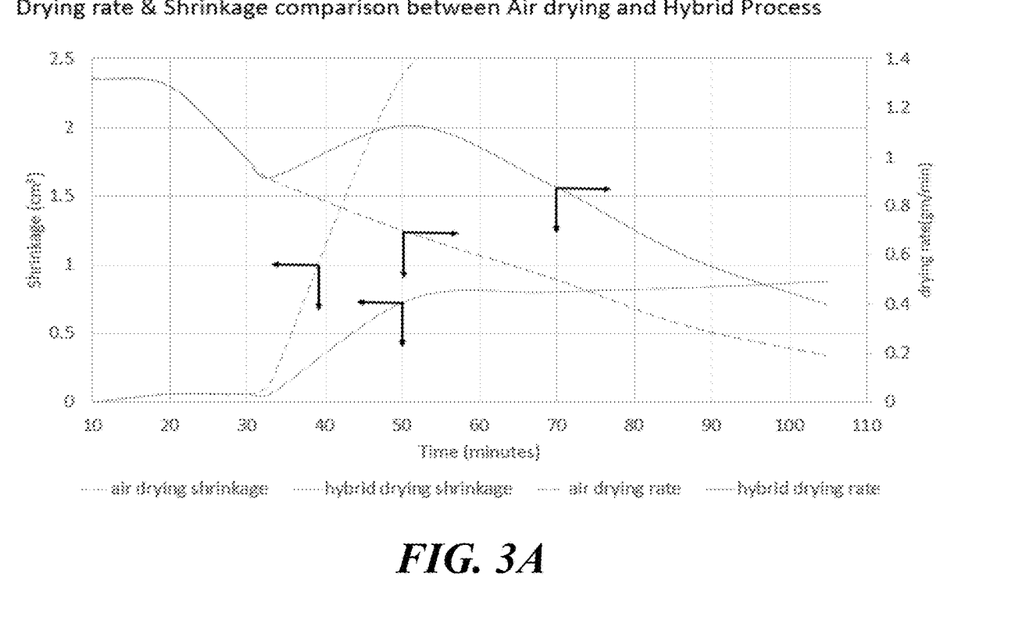
FIG. 3A is a graph showing the comparison for drying rate and shrinkage between an air-drying process and a process according to the present invention for potato. The arrows indicate which X and Y axis apply. Hybrid process refers to the process of the present disclosure.
Figure 3B:
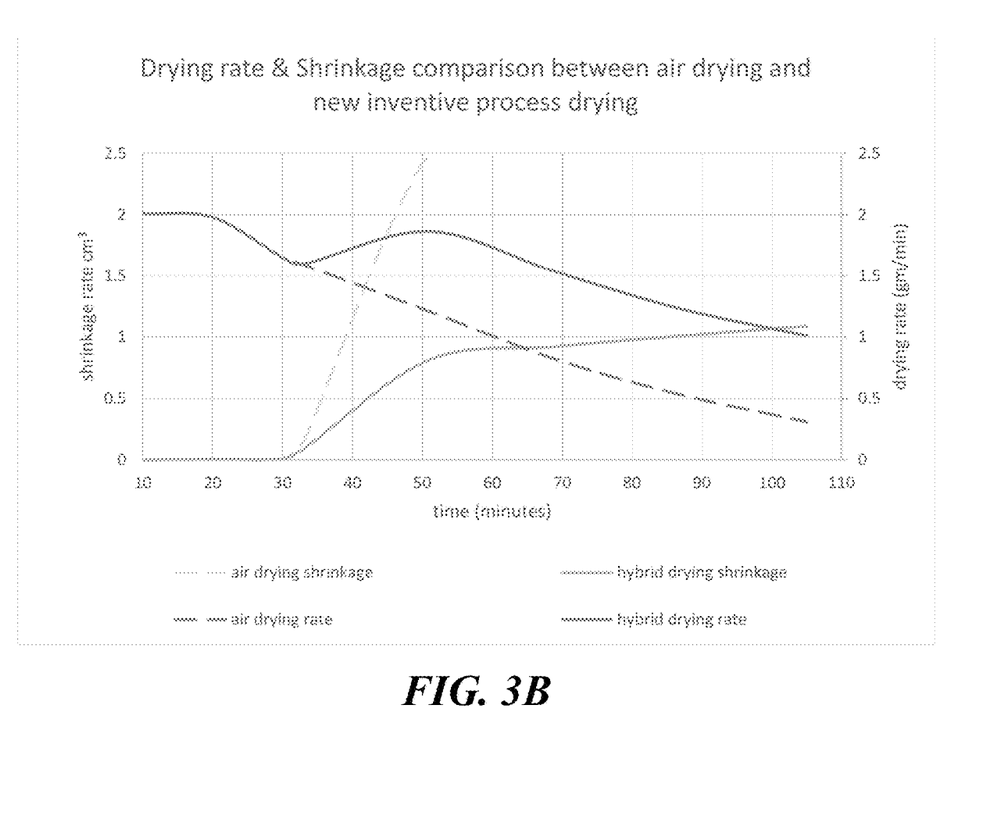
FIG. 3B is a graph showing the comparison for drying rate and shrinkage between the air-drying process and a process according to the present invention for sweet-potato. Hybrid process refers to the process of the present disclosure.

Although air-drying is used as an economical commercial practice for manufacturing dehydrated products, it results in shrunken products of very poor quality. On the other hand, use of $SCCO_2$ results in faster drying with minimum shrinkage. The process is, however, not economically attractive because of high operating costs. As shown in FIG. 2, FIG. 3A, and FIG. 3B the $SCCO_2$ rate of drying is not constant during the entire process as claimed by Brown et al (2010) and follows the same trend as air drying. It can be seen in FIG. 3A and FIG. 3B, that air-drying rate becomes slower after 20 minutes and therefore further removal of moisture from the product is best achieved through the $SCCO_2$ process. As for the initial removal of moisture from the product, it can be seen in FIG. 2 that for the first 20 minutes the rate of air-drying for blanched sample is faster than drying with $SCCO_2$ containing ethanol. Drying with $SCCO_2$ after blanching is initially slower since $SCCO_2$ becomes saturated faster with the surface moisture and the rate of removal of water by $SCCO_2$ is reduced. Therefore, as finally shown in FIG. 3A and FIG. 3B, with the application of this new inventive process, minimum shrinkage with maximum rate of drying can be achieved and make the process commercially attractive. With the sweet potatoes, rather a faster rate of drying has been observed (shown in FIG. 3B) which makes the process further more attractive at commercial scale.

The literature reported prior art methodologies cannot achieve reduction in the equilibrium pH of the solid food products such as the low acid vegetables and fruits inside a packaging. The invention uses the combination of blanching the fresh cut vegetable in water followed by packaging the product in a gas permeable bag (breathable) with the processing aid (co-solvent)s which are low pH formulations as described in Table 1. The process of blanching increases the porosity within the cellular structure. Then these packaged products are treated with the supercritical carbon dioxide wherein, the high pressure allows for the solubilization of the processing aid (co-solvent) in the $SCCO_2$ and the changes in the temperatures during the process allow for the faster diffusivity of the solvent and also effect the solubility during the process. The residence time in the pressurized chamber allows for the infusion of the processing aid (co-solvent) inside the cellular structure of the vegetable via the interaction between the solubilized processing aid (co-solvent)s and the product. After this the pressure is quickly reduced to bring the $CO_2$ to gas phase from its supercritical state. This allows for the separation of the processing aid (co-solvent) from the supercritical $CO_2$ before all the $CO_2$ leaves the system, hence resulting in lowering of pH of the product. Finally the system is slowly depressurized and the processed vegetable product is taken out from the system.

Unique Features of the Invention:

Along with the removal of moisture from the product during the process, the moderately high-temperature $SCCO_2$ treatments partially cooks the starches which further decreases the time and temperature required for final cooking/frying/baking.

For example, performing the combined treatments on the fresh-cut potatoes and sweet potatoes results in shelf-stable French Fries that can be cooked at a lower temperatures of 350° F. (baking or frying) and for a shorter time-period of 10-15 minutes when baked or 2-5 minutes when fried; whereas, frozen potato or sweet potato French fries are recommended to be cooked at 400-450° F. for 20-30 minutes when baked and 5-6 minutes when fried. Unlike the frozen French fries which are pre fried before being frozen, the current invention allows for the product to be cooked once 'for a shorter period of time thus resulting in less acrylamide formation, a potential carcinogen.

The various processing aids (co-solvents) used in the process include, for example, the following formulations as mentioned in Table 1, below.

TABLE 1

Various Processing Aids (Co-Solvents) and Their Dosage Per 100 Gram of Food Product

| Processing Aid (Co-Solvent) | Dosage per 100 Gram of Product |
|---|---|
| 200 proof ethanol | 4-12 ml |
| 5-6% acidity distilled water vinegar + 100% lemon juice concentrate | 2-8 ml + 2-5 ml respectively. |
| 5-6% acidity distilled water vinegar + cumin seed + ginger + garlic respectively | 2-8 ml + 2-4 gm + 2-4 gm + 2-4 gm, respectively |
| 5-6% acidity distilled water vinegar + 100% apple juice concentrate + cumin seed + ginger + garlic respectively | 2-8 ml + 1-3 ml + 2-4 gm + 2-4 gm + 2-4 gm respectively. |

TABLE 1-continued

Various Processing Aids (Co-Solvents) and Their Dosage Per 100 Gram of Food Product

| Processing Aid (Co-Solvent) | Dosage per 100 Gram of Product |
|---|---|
| Various Oleoresins | 1-4 ml, respectively |
| Lactic Acid | 2-8 ml |
| Lactic acid + lemon Juice concentrate | 2-8 ml + 2-5 ml, respectively. |
| Lactic acid + 5-6% acidity distilled water vinegar | 2-8 ml + 2-5 ml, respectively. |
| 5-6% acidity distilled water vinegar | 2-8 ml |
| GDL (Gluconodeltalactone) + 5-6% acidity distilled water vinegar | 2-8 ml + 2-8 ml, respectively. |
| Bisulfates of Soda + 5-6% acidity distilled water vinegar | 2-8 ml + 2-8 ml, respectively. |

The treatment results in the lowering of the pH of the product that are packaged in gas permeable bag (breathable), due to the interaction of the solubilized lower pH processing aid (co-solvent) formulations with the product. This interaction over time leads to the impregnation of the processing aid (co-solvent)s within the cellular structure of the product which results in the inactivation of the enzyme, since the enzymatic activity is known to be dependent on the pH of the product. The lower pH is also known to act as a barrier/control point for the growth of various pathogenic and spoilage micro-organisms.

Example 2

Various Embodiments of Process Parameters for Shelf-Life Extension of Fresh-Cut Vegetables Various embodiments of the processes of the present disclosure are provided below.

In one embodiment of the process of the present disclosure, the process can involve the following combination of steps: (i) Peeling; (ii) Cutting (length—0.8 cm; width—0.6 cm; breath—0.6 cm); (iii) Blanching (65-90° C. for 5-15 minutes); (iv) Air drying (50-100° C. for 10-25 minutes); (v) Supercritical $CO_2$+ethanol (150-350 Bar; 50-90° C.; $CO_2$ flow rate 2-100 L/minute to provide a residence time of 10 seconds to 1 minute; Ethanol flow rate 2-8 mol of the $CO_2$ flow rate %) @10-45 minutes {continuous flow}; (vi) Depressurization of the vessel; (vii) Supercritical $CO_2$ (150-350 Bar; 50-90° C.; $CO_2$ flow rate 2-100 L/minute to provide a residence time of 10 seconds to 1 minute) @10-45 minutes, Final moisture removal—40-45% {continuous flow}; (viii) Depressurization of the vessel; and (ix) Vacuum packaging.

In another embodiment of the process of the present disclosure, the process can involve the following combination of steps: (i) Peeling; (ii) Cutting (length—0.8 cm; width—0.6 cm; breath—0.6 cm); (iii) Blanching (65-90° C. for 5-15 minutes); (iv) Supercritical $CO_2$+ethanol (150-350 Bar; 50-90° C.; $CO_2$ flow rate 2-100 L/minute to provide a residence time of 10 seconds to 1 minute ; Ethanol flow rate 2-8 mol of the $CO_2$ flow rate %) @10-45 minutes {continuous flow}; (v) Depressurization of the vessel; (vi) Supercritical $CO_2$ (150-350 Bar; 50-90° C.; $CO_2$ flow rate 2-100 L/minute to provide a residence time of 10 seconds to 1 minute) @10-45 minutes, Final moisture removal—40-45% {continuous flow}; (vii) Depressurization of the vessel; and (viii) Vacuum packaging.

In another embodiment of the process of the present disclosure, the process can involve the following combination of steps: (i) Peeling; (ii) Cutting (length—0.8 cm; width—0.6 cm; breath—0.6 cm); (iii) Blanching (85° C.

@10 minutes); (iv) Air drying (85° C. @25-30 minutes), Allowing 18-19% moisture removal; (v) Supercritical $CO_2$+ethanol (300 bar; 80° C.; $CO_2$ flow rate—4l/min; Ethanol flow rate—4 mol %) @15-20 minutes {continuous flow}; (vi) Depressurization of the vessel; (vii) Supercritical $CO_2$ (300 bar; 80° C.; $CO_2$ flow rate—4l/min) @15-20 minutes, Final moisture removal—40-45% {continuous flow}; (viii) Depressurization of the vessel; and (ix) Vacuum packaging.

In another embodiment of the process of the present disclosure, the process can involve the following combination of steps: (i) Peeling; (ii) Cutting (length—0.8 cm; width—0.6 cm; breath—0.6 cm); (iii) Blanching (85° C. @10 minutes); (iv) Supercritical $CO_2$+ethanol (300 bar; 80° C.; $CO_2$ flow rate—4l/min; Ethanol flow rate—4 mol %) @15-20 minutes {continuous flow}; (v) Depressurization of the vessel; (vi) Supercritical $CO_2$ (300 bar; 80° C.; $CO_2$ flow rate—4l/min) @15-20 minutes, Final moisture removal—40-45% {continuous flow}; (vii) Depressurization of the vessel; and (viii) Vacuum packaging.

In another embodiment of the process of the present disclosure, the process can involve the following combination of steps: (i) Peeling; (ii) Cutting (length—0.8 cm; width—0.6 cm; breath—0.6 cm); (iii) Blanching (85° C. @10 minutes); (iv) Air Drying; (85° C. @25-30 minutes) (v) Packaging in breathable bags; (vi) Supercritical $CO_2$+apple juice concentrate or 5% distilled water vinegar (300 bar; 100° C. @15-20 minutes {non-continuous flow}; (vii) Depressurization of the vessel.

In another embodiment of the process of the present disclosure, the process can involve the following combination of steps: (i) Peeling; (ii) Cutting (length—0.8 cm; width—0.6 cm; breath—0.6 cm); (iii) Blanching (85° C. @10 minutes); (iv) Packaging in breathable bags; (v) Supercritical $CO_2$+apple juice concentrate or 5% distilled water vinegar (300 bar; 100° C. @15-20 minutes {non-continuous flow}; (v) Depressurization of the vessel.

In another embodiment of the process of the present disclosure, the process can involve the following combination of steps: (i) Peeling; (ii) Cutting (length—0.8 cm; width—0.6 cm; breath—0.6 cm); (iii) Blanching (85° C. @10 minutes); (iv) Air drying (85° C. @25-30 minutes), Allowing 18-19% moisture removal; (v) Supercritical $CO_2$+ethanol (300 bar; 80° C.; $CO_2$ flow rate—4l/min; Ethanol flow rate—4 mol %) @15-20 minutes {continuous flow}; (vi) Depressurization of the vessel; (vii) Supercritical $CO_2$ (300 bar; 80° C.; $CO_2$ flow rate—4l/min) @15-20 minutes, Final moisture removal—40-45% {continuous flow}; (viii) Depressurization of the vessel; (ix) Packaging in breathable bags; (x) Supercritical $CO_2$+apple juice concentrate or 5% distilled water vinegar (300 bar; 100° C. @15-20 minutes {non-continuous flow}; (xi) Depressurization of the vessel.

In another embodiment of the process of the present disclosure, the process can involve the following combination of steps: (i) Peeling; (ii) Cutting (length—0.8 cm; width—0.6 cm; breath—0.6 cm); (iii) Blanching (85° C. @10 minutes); (iv) Supercritical $CO_2$+ethanol (300 bar; 80° C.; $CO_2$ flow rate—4l/min; Ethanol flow rate—4 mol %) @15-20 minutes {continuous flow}; (v) Depressurization of the vessel; (vi) Supercritical $CO_2$ (300 bar; 80° C.; $CO_2$ flow rate—4l/min) @15-20 minutes, Final moisture removal—40-45% {continuous flow}; (vii) Depressurization of the vessel; (viii) Packaging in breathable bags; (ix) Supercritical $CO_2$+apple juice concentrate or 5% distilled water vinegar (300 bar; 100° C. @15-20 minutes {non-continuous flow}; (x) Depressurization of the vessel.

Process parameters of various embodiments of the process of the present disclosure are identified in table form in Table 2 and Table 3, shown below.

TABLE 2

Various Processing Parameters of Embodiments of the Process of the Present Disclosure

| Blanching | Air Drying | Super-Critical $CO_2$ with Ethanol | $SCCO_2$ without Ethanol | Packaging | Super-Critical $CO_2$ |
|---|---|---|---|---|---|
| 85° C. @ 10 minutes | 85° C. @ 25 minutes | 250-300 bar 60-80° C. $CO_2$ flow rate: 4 L/min Ethanol flow rate: 4 mol % of $CO_2$ flow rate Time of Run-15 minutes | 250-300 bar 60-80° C. $CO_2$ flow rate: 4 L/min Time of Run-15 minutes | Done in breathable bags with processing aid (co-solvent) (2-4% of mass of product packaged) | 250-300 bar 80-90° C. Time of Run-15 minutes |

Storage period-45 days
Storage condition-room temperature (20° C.)

TABLE 3

Various Parameters of Embodiments of the Method of the Present Disclosure

| Method of Preparation | Time | Temperature |
|---|---|---|
| Frying | 2-3 minutes | 350° F. |
| Baking | 4-5 minutes | 350° F. |

Example 3

Shelf-Life Extension of Potato Products

Material and Methods

Preparation of Potato:

Potato were peeled and cut in the standard dimensions of French fries: length—5.90 cms; breath—0.8 cms; width—0.8 cms. The initial moisture content of the potato was calculated by drying the samples at 105° C. for 48 hours. The moisture content of the potato was calculated to be 78% on the basis of the mass loss, before and after drying.

Supercritical $CO_2$ Drying:

During the process, $CO_2$ from a cylinder (at 750 psi) was passed to a pump, which compresses the $CO_2$. The compressed $CO_2$ was preheated to the desired temperature with a heating element. Once the desired temperature and pressure was attaintted for the $CO_2$ in the vessel, the exit valves were opened to attain a constant flow rate of the $CO_2$ through the product placed in the vessel. An external high pressure pump was attached to the system to inject the ethanol at a desired flow rate. At the end of the experiment the ethanol flow was stopped and the product was further treated with only supercritical $CO_2$ to remove the remaining processing aid (co-solvent) from the samples in the vessel. At the end of the process the vessel was depressurized. The samples were removed and weighed. By calculating the loss of mass: initial mass of the sample—final mass of the sample after processing with supercritical $CO_2$, the loss of moisture from the product was calculated and the water activity of the product was instrumentally measured. The measurements for the final product dimensions were made using a Vernier caliper.

Media Preparation:

PDA: The 15 grams of potato dextrose agar was mixed in 1 liter of deionized water. It was mixed well, then autoclaved at 121° C. cycle. The media was then poured into the petri plates and stored in the refrigerator at 4-7° C. until used.

PCA: The 15 grams of agar media was mixed in 1 liter of deionized water. It was mixed well, then autoclaved at 121° C. cycle. The media was then poured into the petri plates and stored in the refrigerator at 4-7° C. until used.

Peptone Water: 15 grams of peptone was mixed in 1 liter of deionized water. It was mixed well, then it was poured into the 10 ml test tubes and the 25 ml screw caped test tubes. Then these were autoclaved at 121° C. cycle. In each 10 ml test tube 9 ml of peptone water was poured for the serial dilution. And in the 25 ml ones, 20 ml was poured which were used for the stomaching the samples before plating.

Microbial Activity Determination:

The stored samples were opened up and placed into the stomacher bag and the 20 ml of peptone water was added to it. Then these samples were placed in the stomacher for 3 min at 250 rpm. Then 1 ml of the peptone solution was pipetted out from the bag and was added to the 9 ml test tube of peptone water. The serial dilution were done up till $10^{-6}$ maximum. Then 1 ml of the solution was pipetted out of the serial diluted tube $10^{-6}$ which were emptied into three petri plates of the PDA and PCA respectively. It was spread uniformly around the whole plate and were stored at the 30° C. for 48 hours to calculate the total plate count using the below formula:

Initial dilution*subsequent dilution*amount plated=dilution factor

Reciprocal of dilution factor*colonies formed= cfu/gm

Polyphenol Oxidase (PPO) Activity Measurement:

Enzymatic activity was assayed by the method proposed by (Gui, et al., 2005) with modifications. The substrate solution consists of the phosphate buffer solution (PBS-0.05M, pH-6.0) containing 0.05M cathechol. 10 grams of potato was taken and added to 25 ml of the substrate solution and were incubated at 30° C. for 50 minutes. PPO activity was determined by measuring the absorbance of the mixture at 420 nm, using spectrophotometer at the ambient temperature (25° C.). The PPO activity was determined as the change in the absorbance at 420 nm/min and per milliliter of potato sample. The relative activities of the PPO were obtained with the following formula:

$$\text{Residual Activity} = \frac{\text{specific activity of } PPO \text{ treated with } SCCO_2 * 100\%}{\text{Specific activity of } PPO \text{ before } SCCO_2}$$

Example 4

Shelf-Life Extension of Potato Products
Material and Methods
Preparation of Potato:

Potato were peeled and cut in the standard dimensions of French fries: length, 5.90 cm; breadth, 0.8 cm; and width, 0.8 cm.

Supercritical Carbon Dioxide Process:

The potato samples were packaged in gas permeable bag (breathable) and the processing aids (co-solvents) (4% of the mass of potato) were placed in the bag along with the potatoes. The bags were sealed and placed inside a high-pressure treatment vessel. During the process, the $CO_2$ from the cylinder (at 750 psi) pressurized to the desired pressure by a pump preheated to the desired temperature with a heating element and injected into the treatment vessel. The pressurized vessel was left static for a predetermined time. Then the vessel was depressurized swiftly to bring the carbon dioxide to gas phase and emptied slowly.

Measurement of the pH:

The potato samples were taken out from the processed bag and 5 gm of random sample was taken. The sample was kept on the tissue paper to remove any residue of the condensation from the packaging. Then the samples were cut into small pieces and mashed to make a paste with the addition of DI water, if required. The pH probe was dipped into the solutions to measure the pH.

Measurement of the Reflectance:

A color dye such as Disperse Blue 79 was placed in 0.1% of mass of potato along with the processing aid (co-solvent) in the bag. Once the process was complete, random 5 gram sample was taken from the processed bag and various cross-sections of the samples were made. The reflectance of the various cross-sections of the samples was measured using a SP600$^+$ spectrophotometer at a wavelength of 700 nm.

REFERENCES

Citation of a reference herein shall not be construed as an admission that such reference is prior art to the present invention. All references cited herein are hereby incorporated by reference in their entirety. Below is a listing of various references relating to the present disclosure:

1. Bernadette Revel-McInnis Davis, A. G. (2016). U.S. Pat. No. 9,271,511 B2.
2. Borisenok, J. G. (1991). U.S. Pat. No. 4,988,523A.
3. Brown, Z., Fryer, P., Norton, I., & Bridson, R. (2010). Drying of agar gels using supercritical carbon dioxide. *the journal of supercritical fluids*, 89-95.
4. Eisenhut, T. W. (2006). U.S. Pat. No. 7,108,832B2.
5. Frederick G, K., & Kirkwood, J. G. (1930). The Dielectric Constant of carbon dioxide as a function of temperature and density. *Physics review*, 754-761.
6. Fryer, Norton, P., bakalis, I., & bridson, S. &. (2007). Drying of foods using supercritical carbon diooxide-Investigation with carrot. *Innovative Food Science & Emerging technologies.*, 280-289.
7. Gui, F., Wu, J., Chen, F., Liao, X., Hu, X., Zhang, Z., & Wang., Z. (2005). Inactivation of poyphenol oxidase in cloudy apple juice exposed to supercritical carbon dioxide. *Journal of Food Chemistry*, 1678-1685.
8. King, M., Mubarak, A., & Kim, J. &. (2005). the mutual solubility of water with supercritical and liquid carbon dioxide. *Journal of supercritical fluids*, 296-302.
9. Lee, C.-H. (1982). U.S. Pat. No. 4,336,273 A.
10. Nijhuis, H., Torringa, H., Muresan, S., Yuksel, D., Leguijit, C., & Kloek, W. (1998). Approaches to improving the quality of dried fruit and vegetables . *Trends in Food Science and Technology*, 13-20.
11. Oliveira, M., Abadias, M., Usal, J., Tones, R., Teixido, N., & Vinas, I. (2015). Application of Modified Atmospheric packaging as a safety approach to fresh cut fruits and vegetables. *trends in food science and technology*, 13-26.
12. Wimmer, Z., & Zarevucka, M. (2010). A Review on the effects of Supercritical Carbon Dioxide on Enzyme Activity. *International Journal of Molecular Sciences*, 233-253.

Illustrative embodiments of the processes, methods, and products of the present disclosure are described herein. It should be understood, however, that the description herein of the specific embodiments is not intended to limit the present disclosure to the particular forms disclosed but, on the contrary, the intention is to cover all modifications equivalents and alternatives falling within the spirit and scope of the invention by the appended claims. Thus, although the present invention has been described for the purpose of illustration, it is understood that such detail is solely for that purpose and variations can be made by those skilled in the art without departing from the spirit and scope of the invention which is defined by the following claims.

What is claimed is:

1. A process for improving shelf-life of cut vegetables, comprising the steps of:
   blanching cut vegetables;
   packaging said cut vegetables in a sealed gas permeable/breathable container;
   processing said cut vegetables within said sealed gas permeable/breathable container and comprising subjecting said cut vegetables within said sealed gas permeable/breathable container to a supercritical fluids procedure, wherein said supercritical fluids procedure of said processing step comprises subjecting said cut vegetables to a supercritical fluid and a processing aid; and
   depressurizing said cut vegetables within said sealed gas permeable/breathable container, wherein said depressurizing step comprises a first depressurizing step and a second depressurizing step, wherein said first depressurizing step is executed at a first depressurization rate that deposits said processing aid within a cellular structure of said cut vegetables while within said sealed gas permeable/breathable container, wherein said second depressurizing step is executed after said first depressurizing step and at a second depressurization rate, and wherein said first depressurization rate is faster than said second depressurization rate.

2. The process of claim 1, wherein said cut vegetables are free from exposure to heating, freezing, canning, and chemical treatment prior to execution of said blanching step.

3. The process of claim 1, wherein said blanching step is conducted at a temperature of between about 65° C-90° C. for at least 5 minutes.

4. The process of claim 1, further comprising cutting vegetables into said cut vegetables, wherein said blanching step is executed within about 60 minutes after said cutting step.

5. The process of claim 1, wherein said processing aid used by said supercritical fluids procedure of said processing step is disposed within said sealed gas permeable/breathable container prior to subjecting said cut vegetables to said supercritical fluid used by said processing step.

6. The process of claim 1, wherein said supercritical fluids procedure of said processing step comprises disposing said sealed gas permeable/breathable container within a chamber, and introducing both said supercritical fluid and said processing aid into said chamber.

7. The process of claim 1, wherein said supercritical fluid used by said supercritical fluids procedure of said processing step is supercritical carbon dioxide.

8. The process of claim 1, further comprising:
   executing a moisture removal operation after said blanching step, before said supercritical fluids procedure of said processing step, and comprising:
      subjecting said cut vegetables to a first supercritical fluids procedure to remove moisture from said cut vegetables, wherein said first supercritical fluids procedure of said moisture removal operation comprises subjecting said cut vegetables to a supercritical fluid and a first processing aid; and
      subjecting said cut vegetables to a second supercritical fluids procedure to remove moisture from said cut vegetables, wherein said second supercritical fluids procedure of said moisture removal operation is executed after said first supercritical fluids procedure of said moisture removal operation, and wherein said second supercritical fluids procedure of said moisture removal operation comprises subjecting said cut vegetables to a supercritical fluid without said first processing aid; and
   wherein said first processing aid used by said first supercritical fluids procedure of said moisture removal operation is different from said processing aid used by said supercritical fluids procedure of said processing said cut vegetables within said sealed gas permeable/breathable container.

9. The process of claim 8, further comprising removing surface moisture from said cut vegetables after said blanching step and before said moisture removal operation.

10. The process of claim 9, wherein said removing surface moisture step comprises air-drying said cut vegetables.

11. The process of claim 10, wherein said air-drying step is conducted at about 50° C-250° C. for at least 1 minute.

12. The method of claim 10, further comprising terminating said air-drying step after surface moisture has been removed from said cut vegetables, wherein said moisture removal operation comprises removing internal moisture from said cut vegetables after termination of said air-drying step.

13. The process of claim 8, wherein said second supercritical fluids procedure of said moisture removal operation comprises removing said first processing aid from said cut vegetables.

14. The process of claim 8, wherein said supercritical fluid is the same for each of said first supercritical fluids procedure of said moisture removal operation, said second supercritical fluids procedure of said moisture removal operation, and said supercritical fluids procedure of said processing step.

15. The process of claim 8, wherein said supercritical fluid is supercritical carbon dioxide for each of said first supercritical fluids procedure of said moisture removal operation, said second supercritical fluids procedure of said moisture removal operation, and said supercritical fluids procedure of said processing step.

16. The method of claim 8, wherein no processing aid is used for said second supercritical fluids procedure of said moisture removal operation.

17. The method of claim 1, wherein said cut vegetables comprise potatoes or sweet potatoes.

18. The method of claim 17, wherein said potatoes or sweet potatoes are in a form selected from the group consisting of French fries, tater tots, and scalloped potatoes.

19. The method of claim 1, wherein said cut vegetables are French fries.

* * * * *